June 23, 1959 S. R. RICH ET AL 2,892,085
CONTROL CIRCUIT
Original Filed May 22, 1951
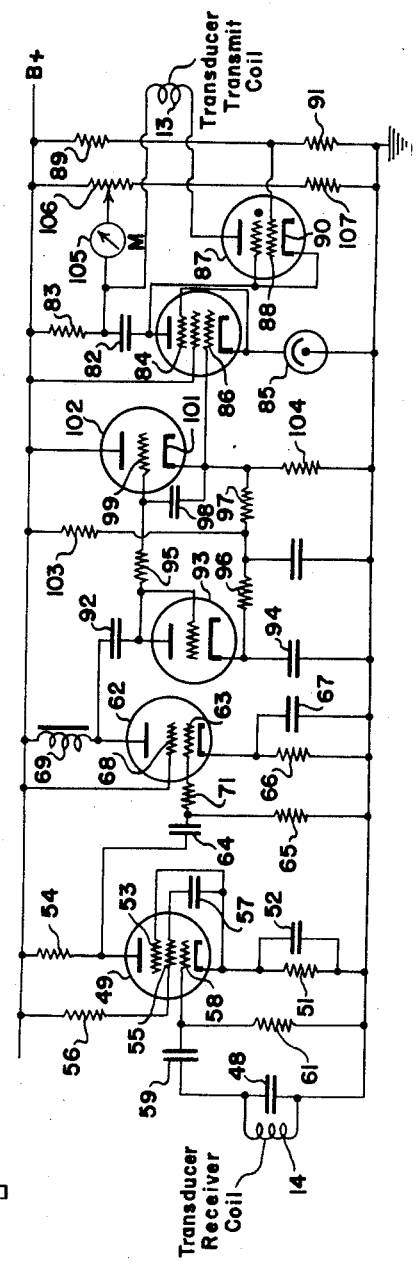
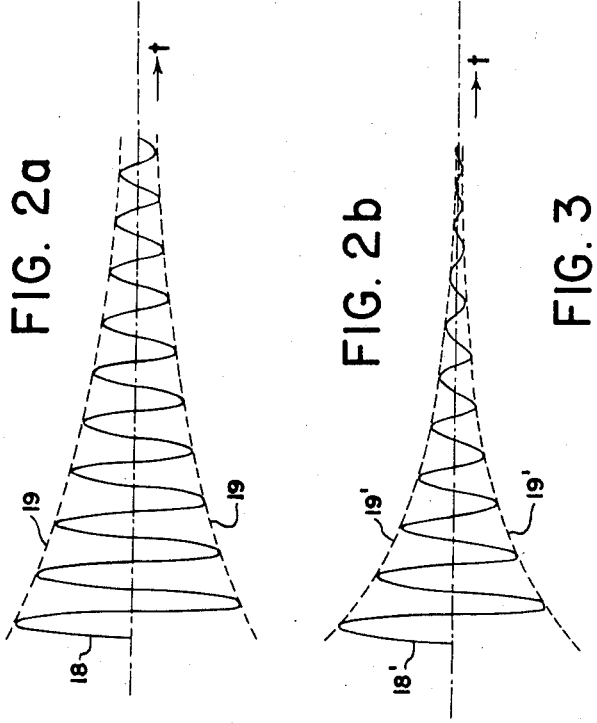
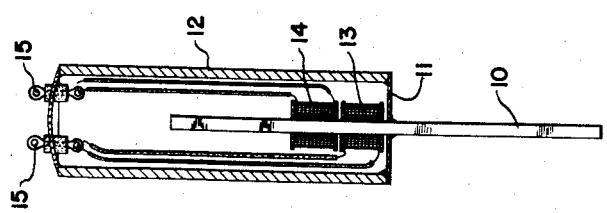
INVENTORS.
Stanley R. Rich
BY Wilfred Roth
ATTORNEYS June 23, 1959

United States Patent Office 2,892,085
Patented June 23, 1959

2,892,085

CONTROL CIRCUIT

Stanley R. Rich and Wilfred Roth, West Hartford, Conn., assignors to Bendix Aviation Corporation, New York, N.Y., a corporation of Delaware Original application May 22, 1951, Serial No. 227,694. Divided and this application January 20, 1956, Serial No. 560,402

3 Claims. (Cl. 250—36)

This invention relates to apparatus for maintaining constant the average area of pulse-excited damped oscillations, and the application is a division of Serial No. 227,694, filed May 22, 1951, now Patent No. 2,839,915 for "Method and Apparatus for Measuring Viscosity, etc. of Fluid-Like Materials."

The parent application describes apparatus for determining physical properties of fluid-like materials, including liquids and thin films, and particularly the viscosity thereof. A number of different embodiments are described for attaining the desired result.

In one type of apparatus, oscillations are pulse-excited in an elongated strip of solid material and, when the strip is contacted by a fluid-like material, the oscillations in the strip are damped. As shown in the aforesaid application, the damping changes with the viscosity of the fluid-like material.

In one form of instrumentation the pulse repetition rate is automatically controlled by the damped oscillations so as to maintain constant the average area of the damped oscillations. The pulse repetition rate varies directly with the damping coefficient of the damped oscillations, and is hence a measure of the viscosity.

The present divisional application is directed to the circuit means whereby the pulse repetition rate is automatically controlled to maintain constant the average area of the damped oscillations to a high degree of precision.

Although the invention of the present application is particularly advantageous in connection with viscosimeters, etc., as described in the parent application, it is capable of general application and can be used in widely different fields. However, for convenience, the specific embodiment will be described in connection with the measurement of viscosity.

The invention will be more fully understood by reference to the following description of a specific embodiment thereof, taken in conjunction with the drawings, in which:

Fig. 1 is a longitudinal cross-section of one embodiment of a sensing device useful in measuring viscosity;

Figs. 2a and 2b illustrate attenuated or damped oscillations, Fig. 2b being more highly damped than 2a; and Fig. 3 is a circuit diagram of a variable repetition rate pulse generator and means for controlling the repetition rate in accordance with the average area of the damped oscillations.

Referring to Fig. 1, a sensing device is shown having an elongated strip 10 of magnetostrictive material, such as nickel, secured at its center to wall 11 affixed at one end of a cylindrical container 12. End wall 11 and container 12 may be made of any desired material, depending upon the application, and are here shown as a material such as stainless steel. Transducer means are provided in the form of two coils 13 and 14 encircling elongated strip 10 within the housing 12, but spaced slightly therefrom in order not to damp oscillations in the strip.

As here shown, coil 13 is the transmitter coil and coil 14 is the receiver coil of the transducer. Suitable terminals 15 are provided for the ends of each coil. Although two coils are shown, it is possible in many cases to employ only one coil and use it for both transmitting and receiving.

When a pulse of current is applied to transmitter coil 13, longitudinal compressional elastic waves are excited in elongated strip 10 by magnetostrictive action. The length of strip 10 is selected so that resonant oscillations at a desired frequency are produced therein by an applied pulse. In the specific illustration, the length of strip 10 is one-half the wavelength of the resonant oscillations.

It is advantageous to support the strip at a nodal plane of all odd harmonics of the fundamental resonant oscillations. Since this is an antinodal plane for all even harmonics, these are rapidly damped out, thus facilitating subsequent electrical filtering. In the specific embodiment here shown, the half-wave strip is supported at its midpoint so as to eliminate all even-order harmonics, and so as to couple a negligible amount of fundamental energy into the housing.

When the sensing device or probe of Fig. 1 is used in measuring viscosity, the exposed portion of strip 10 is immersed in or otherwise contacted by the liquid or other fluid-like material.

With the probe of Fig. 1 disposed in air or a vacuum, oscillations produced in strip 10 by a pulse will gradually die away due to the inherent damping of the device. However, the attenuation of the oscillations will be relatively small, and hence the period of decay will be relatively long. This condition is illustrated in Fig. 2a. The alternating wave 18 represents the resonant oscillations and they gradually decay with time. It will be understood that wave 18 is only schematic, since a very large number of oscillations will occur in the decaying wave. In a particular embodiment which has been operated with success, the frequency of the oscillations as determined by strip 10 is of the order of 25 kilocycles per second.

The envelope of the wave has an exponential characteristic as indicated by dash lines 19. The shape of line 19 is usually denoted:

$$e^{-\alpha t} \qquad (1)$$

where $e$ = base of the Naperian logarithms
$\alpha$ = damping coefficient
$t$ = time Now, if the exposed end at strip 10 outside the casing 12 is immersed in a liquid, for example, the liquid damps the oscillations so that they decay faster. This condition is illustrated in Fig. 2b and it will be noted that the envelope 19' decays more rapidly. In the equation given above the damping coefficient $\alpha$ is greater for the wave of 2b than for 2a. By measuring the attenuation of the wave in the solid strip, particularly the damping coefficient $\alpha$, a measure of the viscosity can be obtained.

A complete description of the sensing device or probe and the relationship of the attenuation of the oscillations to various physical characteristics of a fluid-like material is given in the aforesaid application. Also, the cross-sectional shape of the strip 10 is discussed. In addition, it is pointed out that sheer elastic waves or torsional elastic waves can be employed instead of longitudinal compressional waves if desired.

It is believed that the foregoing discussion of the probe and its functioning suffices for the purpose of understanding the present invention and, for further discussion thereof, reference is made to the aforesaid application.

Referring now to Fig. 3, a form of instrumentation is shown using a variable pulse repetition rate. Each pulse excites a train of resonant oscillations in the elongated strip 10 (Fig. 1) which gradually decay, as illustrated in Figs. 2a and 2b. Advantageously the range of pulse repetition rates is selected so that the damped oscillation decays to a negligible value between successive pulses over the range of operation for which the instrument is designed, although this is not essential in all cases.

Advantageously the pulse length is selected so that its duration is less than a half period of the resonant oscillation, so as not to interfere with the rapid build-up of oscillations in the strip. Pulses of the order of one microsecond have been employed with success. Electrical waves corresponding to the elastic waves in strip 10 are produced in the transducer means (receiver coil 14 in Fig. 1) and have the wave shape shown in Fig. 2.

The variable frequency pulse generator is shown at the right of Fig. 3. A capacitor 82 is inserted in a charging circuit which includes B+, a series resistor 83 and a controllable variable resistor which here takes the form of a pentode 84. The cathode is maintained at a constant D.-C. value by the voltage regulator tube 85. The screen grid is connected to B+ and the suppressor grid is connected to the cathode. The effective anode-cathode resistance of tube 84 is controlled by its grid-cathode potential and other inherent characteristics. Thus by varying the potential applied to grid 86, the rate of charging of capacitor 82 can be controlled.

A discharge circuit for capacitor 82 is provided including the transmit coil 13 of the transducer and a grid-controlled gas discharge tube 87, here shown as of the tetrode type. The control grid 88 of the discharge tube is maintained at a selected positive potential by a voltage divider consisting of resistors 89 and 91 from B+ to ground.

Immediately after a discharge of capacitor 82, the potential of cathode 90 of the discharge tube will be highly positive and the tube will be cut off. As capacitor 82 charges, the potential of cathode 90 will gradually fall. When it reaches a value nearly equal to the grid potential, the tube will fire and a short pulse of current will pass through the series transmit coil 13. This circuit arrangement assures that the charge across the capacitor will always reach a predetermined fixed potential before it is discharged. Consequently current pulses of uniform amplitude and duration will pass through transmit coil 13 regardless of the pulse repetition rate. The latter is determined by the rate of charging capacitor 82, and the charging rate is in turn controlled by tube 84.

With the circuit shown, the pulse repetition rate may be varied over a wide range with excellent stability. In a circuit which has been used in practice, in which tube 84 is a 6AG7 and tube 87 is a 2050, a variation of several thousand pulses per second down to zero is attainable with a 5-volt change in the grid-cathode potential of tube 84. By using other tubes and selecting suitable circuit constants, any desired range can be obtained.

The transducer receiving coil 14 is shown at the left of Fig. 3, and is tuned by capacitor 48 to the resonant frequency of the ringing oscillations in the elongated strip 10. As explained before, by mounting strip 10 at its midpoint, the second harmonic is eliminated along with higher even-order harmonics. The simple tuned circuit shown suffices to eliminate the third harmonic and higher odd-order harmonics. Thus, only the fundamental resonant frequency is effective in the measuring circuit.

The received oscillations are then applied to an amplifier tube 49, here shown as a high gain pentode. Cathode bias is provided by the cathode resistor 51 and shunting capacitor 52, and the suppressor grid 53 is connected to the cathode. Anode voltage is obtained from the B+ source through the load resistor 54. Operating potential for the screen grid 55 is obtained from the B+ source through resistor 56 and shunting capacitor 57. The signal is applied to the control grid 58 through coupling capacitor 59 and grid resistor 61.

This amplifier stage is designed to amplify with reasonable linearity the entire received damped oscillations. The output signal is fed to a second amplifier stage including the electronic tube 62, here shown as a beam power tetrode capable of delivering sizable amounts of power. The output of tube 49 is fed to the control grid 63 through coupling capacitor 64 and grid resistor 65. A limiting series resistor 71 is inserted in the grid circuit for purposes to be described later. Cathode bias is provided by the cathode resistor 66 and shunting by-pass capacitor 67. The screen grid 68 is connected directly to the B+ source and the anode is connected to B+ through the choke 69.

The amplified signal is then applied to an averaging detector to develop an integrated control wave proportional to the average value of the rectified damped oscillations. To this end, the output of tube 62 is supplied through a coupling capacitor 92 to a rectifier 93, here shown as a triode with its plate and grid connected together to form a diode. The R-F circuit of rectifier 93 is completed to ground through capacitor 94. Rectifier 93 acts as a clipper, shunting out the positive half cycles of the signals under the exponential envelopes of Fig. 2, leaving only the negative half cycles. These negative half cycles are integrated by a simple R-C network comprising resistors 95, 96, 97 and capacitor 98. The integrated control wave is applied between grid 99 and cathode 101 of tube 102.

As described thus far, the signal applied to grid 99 would be negative and of a relatively large value due to the high amplification obtained in tubes 49 and 62. As a specific example of one embodiment which has been operated with success, the control wave applied to grid 99 would have a value of approximately —44 volts. To increase precision, a fixed positive reference voltage is subtracted from the control wave. The subtraction is conveniently accomplished by connecting resistor 97 in a voltage divider circuit including resistors 103 and 104, from B+ to ground. Resistor 104 is in the cathode circuit of tube 102 and serves also as the output load resistor. The positive voltage across resistor 97 is advantageously selected to be quite close to the negative control voltage, and in a specific embodiment has been made 40 volts. In consequence, the net control voltage applied between grid 99 and cathode 101 is —4 volts.

Amplifier 102 is designed to have a high gain and in a specific embodiment has a gain of 50. Consequently its cathode potential will change 1 volt for an input signal change of 1/50 volt. The cathode is directly connected to grid 86 of the pulse repetition rate control tube 84.

As previously mentioned, a relatively small voltage change, 5 volts in the specific example given, suffices to change the pulse repetition rate over its whole range of operation. This 5-volt change can be obtained by a 1/10-volt change in the grid voltage of tube 102, and hence a 1/10 volt change in the integrated signal $$\frac{E_o f}{\alpha}$$

(explained hereinafter). With a normal value of integrated signal of —44 volts, a change in the integrated value of only 1/4 % suffices to change the pulse repetition rate over its entire range.

It will therefore be seen that this circuit holds the integrated value of the received signals constant to within 1/4 % over its entire operating range. This accuracy is obtained through the use of high amplification and the subtraction of a large fixed amount from the integrated signal in obtaining the net control signal. Actually, in practice, the full range of operation is ordinarily from several thousand cycles per second to about 10 c.p.s. This corresponds to a viscosity range from zero to 100,000 centipoises. Suitable modifications may of course be made to obtain viscosity measurements in any selected range.

In operation, the circuit of Fig. 3 gives a pulse repetition rate which is almost exactly proportional to the exponential damping coefficient α. This can be shown as follows:

The area under an exponential wave such as shown at 19 in Fig. 2 (the rectified and detected A.-C. wave) is equal to:

$$\int_0^\infty E_0 e^{-\alpha t} dt = -\frac{E_0}{\alpha} e^{-\alpha t} \Big]_0^\infty = \frac{E_0}{\alpha} \quad (2)$$

where $E_0$=initial magnitude of the envelope of the received signal.

This assumes that $t$ approaches infinity, which is the case where the exponential envelope is allowed to decay to a negligible value before the next pulse is transmitted.

In a given period of time, say one second, there are $f$ pulses and $f$ exponential envelopes. Thus the area under the envelopes, integrated over a 1-second period of time, is $$\frac{f \times E_0}{\alpha}$$

The circuit of Fig. 3 causes the integrated area always to equal a constant value C for all conditions. Hence:

$$C = \frac{fE_0}{\alpha} \quad (3)$$

Rearranging:

$$\alpha = \frac{fE_0}{C} \quad (4)$$

$E_0$ and C are constants of the system, or nearly so. Hence $f$ is substantially linear with α. This is a very useful result and is achieved in the system of Fig. 3 to a high order of precision.

In order to measure the pulse repetition rate, voltmeter 105 is connected to the junction of capacitor 82 and resistor 83, and to a zero-setting circuit including potentiometer 106 and resistor 107 from B+ to ground. Inasmuch as the capacitor 82 is always charged to a given potential before it is discharged, the charge $Q_0$ supplied to the condenser for each pulse is always the same. Over a given interval of time, say one second, the total charge supplied to the condenser is $fQ_0$. Since charge per unit time is current, the current through the resistor 83 will be exactly proportional to the repetition rate $f$. That is:

$$I = Q_0 f \quad (5)$$

Voltage across a resistor is directly proportional to current therethrough, so that the average voltage drop across resistor 83 will also be proportional to the repetition rate $f$. Thus meter 105 will vary directly with the repetition rate. By adjusting potentiometer 106 the meter reading may be brought to zero before immersing the elongated strip 10 in the liquid. Thereafter, the meter reading will be directly proportional to pulse repetition rate and hence to the damping factor α.

For a commercial instrument of general application, several meter ranges may be provided to obtain more accurate readings. This is readily accomplished by shunting meter 105 with appropriate resistances.

It will be apparent that since the transmit coil 13 is closely adjacent to receive coil 14 (Fig. 1), the very large transmitted pulse will induce a rather large pulse in the receive coil. The magnitude of this pulse in the receive coil may be many times the initial amplitude of the received oscillatory wave as shown in Fig. 2. While it is possible to eliminate the effect of this initial pulse on the receiver circuit by gating the receiver amplifier or by other means, it has been found satisfactory to design the amplifier stages including tubes 49 and 62 so that they will limit the initially induced pulse to a value which does not greatly exceed the initial value of the resonant oscillation. Some limiting takes place in tube 49 due to the tube being driven beyond cutoff. The time constant of the capacitor 59 and resistor 61 is advantageously low enough so that there is no danger of blocking if the grid is driven momentarily positive. The resistor 71 in series with the grid of tube 62 limits the signal in the positive direction so that it does not substantially exceed the initial portion of the resonant oscillation. These simple expedients have proved to be satisfactory in practice, but more elaborate means may be employed if desired.

The use of separate transmit and receive coils as shown in Fig. 1 is sometimes helpful, for example, where it is desired to use more turns on the receive coil to increase sensitivity. However, a single coil can be used for both purposes ordinarily, with resultant simplification of the sensing device.

In the specific embodiment described, D.-C. pulses are employed for excitation. It is possible to employ short bursts of high-frequency, sometimes termed a pulse-modulated carrier, if desired. In such case suitable changes can be made in the detailed circuitry.

Although the specific embodiment has been described in connection with its use in a viscosimeter, it will be obvious to those skilled in the art that it can be used in widely different applications where it is desired to maintain constant pulse-excited oscillations, or to utilize the pulse repetition rate as an indication of the damping of such oscillations, etc.

We claim:

1. Apparatus for maintaining constant the average area of pulse-excited damped oscillations which comprises means including a source of variable repetition rate pulses for exciting said oscillations, means including a rectifier circuit for producing a direct-current control wave varying with the average value of said oscillations, means including a source of direct-current voltage for subtracting a substantially constant value from said control wave to yield a modified control wave, and connections supplying said modified control wave to said source of pulses to control the repetition rate thereof, the direction of control being predetermined to increase said rate when the rate of decay of said oscillations increases to thereby maintain the average value of said oscillations substantially constant.

2. Apparatus for maintaining constant the average area of pulse-excited damped oscillations which comprises means including a source of variable repetition rate pulses for exciting said oscillations, means including an amplifier for amplifying said oscillations, a rectifier and associated integrating circuit connected to the output of said amplifier to produce a direct-current control wave varying with the average value of said oscillations, means including a source of direct-current voltage for subtracting a substantially constant value from said control wave to yield a modified control wave, an amplifier for amplifying said modified control wave, and connections from the last-named amplifier to said source of pulses to control the repetition rate thereof, the direction of control being predetermined to increase said rate when the rate of decay of said oscillations increases to thereby maintain the average value of said oscillations substantially constant.

3. Apparatus for maintaining constant the average area of pulse-excited damped oscillations which comprises a capacitor and a charging circuit therefor including a source of power, a thermionic tube having a cathode, control grid and anode connected with the cathode-anode circuit thereof in said charging circuit, a discharge circuit connected across said capacitor, said discharge circuit including a grid-controlled gas discharge tube having the anode-cathode circuit thereof connected in series with a pulse output circuit component, a voltage source connected to maintain the grid of said discharge tube at a predetermined potential beyond cutoff when said capacitor is uncharged, said predetermined potential being less than the potential of said source of power whereby said capacitor is discharged when the voltage thereacross reaches a predetermined value and produces a pulse in said pulse output circuit component, means including said pulse output circuit component for exciting said oscillations, means including an amplifier for amplifying said oscillations, a rectifier and associated integrating circuit connected to the output of said amplifier to produce a direct-current control wave varying with the average value of said oscillations, means including a source of direct-current voltage for subtracting a substantially constant value from said control wave to yield a modified control wave, an amplifier for amplifying said modified control wave, and connections from the last-named amplifier to the control grid of said thermionic tube to control the repetition rate of pulses in said pulse output circuit component, the direction of control being predetermined to increase said repetition rate when the rate of decay of said oscillations increases to thereby maintain the average value of said oscillations substantially constant.

References Cited in the file of this patent
UNITED STATES PATENTS

| | | |
|---|---|---|
| 2,103,619 | Hallmark | Dec. 28, 1937 |
| 2,300,271 | Whitaker | Oct. 27, 1942 |
| 2,502,938 | Fryklund et al. | Apr. 4, 1950 |
| 2,569,164 | Greenwood et al. | Sept. 25, 1951 |
| 2,645,715 | Weller et al. | July 14, 1953 |